(12) United States Patent
Freyhult et al.

(10) Patent No.: US 8,982,141 B2
(45) Date of Patent: Mar. 17, 2015

(54) IMAGE PROCESSING METHOD AND APPARATUS

(75) Inventors: Maria Christina Nathalie Freyhult, Malmö (SE); Nils Johan Petter Montan, Malmö (SE); Nils Jonas Leif Eriksson, Gothenburg (SE)

(73) Assignee: BlackBerry Limited, Waterloo (CA)

( * ) Notice: Subject to any disclaimer, the term of this patent is extended or adjusted under 35 U.S.C. 154(b) by 286 days.

(21) Appl. No.: 13/459,944

(22) Filed: Apr. 30, 2012

(65) Prior Publication Data
US 2013/0286018 A1 Oct. 31, 2013

(51) Int. Cl.
*G06G 5/00* (2006.01)
*G09G 5/393* (2006.01)

(52) U.S. Cl.
CPC ............ *G09G 5/393* (2013.01); *G09G 2340/02* (2013.01); *G09G 2340/0407* (2013.01); *G09G 2340/0492* (2013.01); *G09G 2360/121* (2013.01)
USPC ........................................................ 345/581

(58) Field of Classification Search
None
See application file for complete search history.

(56) References Cited

U.S. PATENT DOCUMENTS

| | | | | |
|---|---|---|---|---|
| 6,333,752 B1 * | 12/2001 | Hasegawa et al. | ............ | 715/764 |
| 6,343,160 B1 | 1/2002 | Giannetti et al. | | |
| 6,704,466 B1 * | 3/2004 | Yamamoto et al. | ............ | 382/305 |
| 7,324,749 B2 * | 1/2008 | Kubo | ............................ | 396/429 |
| 7,589,863 B2 * | 9/2009 | Kita | ................................ | 358/1.9 |
| 7,688,332 B2 * | 3/2010 | Yoshio et al. | ................. | 345/591 |
| 7,730,043 B1 | 6/2010 | Bourdev | | |
| 2003/0234871 A1 * | 12/2003 | Squilla et al. | ............. | 348/220.1 |
| 2004/0008356 A1 | 1/2004 | Fujisaawa et al. | | |
| 2005/0212914 A1 * | 9/2005 | Seto et al. | ................... | 348/207.1 |
| 2009/0257097 A1 * | 10/2009 | Ishida | ............................ | 358/448 |
| 2010/0053695 A1 * | 3/2010 | Togami | ........................ | 358/448 |

FOREIGN PATENT DOCUMENTS

EP 1111542 6/2001

OTHER PUBLICATIONS

Christiansen, Mark.; "How to Optimize projects in Adobe after effects CS5", Nov. 10, 2010; XP55034200.
Extended European Search Report mailed Aug. 8, 2012; in corresponding European patent application No. 12166218.3.
Response to the Extended European Search Report filed May 6, 2014; in corresponding European patent application No. 12166218.3.
Canadian Office Action mailed Jan. 26, 2015; in Canadian patent application No. 2,813,877.

* cited by examiner

*Primary Examiner* — Ryan R Yang
(74) *Attorney, Agent, or Firm* — Novak Druce Connolly Bove + Quigg LLP

(57) ABSTRACT

There is disclosed apparatus and a computer implemented method for processing a digital image. The method comprises maintaining ordered cached digital images arranged in a predetermined order. The ordered cached digital images comprise a base digital image and a subsequent plurality of modified cached digital images. Each modified cached digital image is associated with an image modification category. Each subsequent modified cached digital image is generated by performing image modification operations relating to its respective image modification category on the immediately preceding cached image in accordance with the predetermined order.

39 Claims, 7 Drawing Sheets

IMAGE PROCESSING METHOD AND APPARATUS

FIELD OF THE TECHNOLOGY

The present application relates to methods and apparatus for digital image processing and in particular but not exclusively to digital image processing on an electronic device having a display and a user input device.

BACKGROUND

Image processing software provides a user with a variety of tools with which to modify digital images. Typically, such software includes filter effects (e.g. black and white, colour effects or stylisations), and adjustments (e.g. brightness, saturation, contrast adjustments) which are applicable to the whole of an image being edited. Also, selective image modifications are typically provided which can be applied by brushes or other area selection tools. More advanced effects may use an algorithmic approach to identify areas of the image for modification automatically and applying the adjustment. Such algorithmic effects include, for example, automatic red-eye or blemish removal effects.

Each effect or adjustment typically includes a number of user controllable parameters that control the output of the effect and can be edited by a user. Image editing software will typically allow the user to remove or add effects and modify their parameters. Conventionally, when an effect is modified or removed, the original image is reprocessed by applying all the effects that have been selected taking into account any modification of parameters by the user. As will be appreciated, although this allows the user complete freedom to apply, modify or remove effects, it is computationally inefficient because every effect must be reprocessed when the user makes a change.

To improve on this approach some image editing applications record in memory a history of user modifications to the image being edited. This is achieved by storing in memory a different rendered image after each modification made to an image by the user. For example, a cache can be kept containing a chronological list of images corresponding to each modification made to the image. The user can then jump or step back through the cached images to revert to an earlier version of the image. However, this has the disadvantage that the device on which the image editing software is being executed has to store a large number of cached images. This consumes a large amount of memory which can lead to degraded performance of the application.

These computational inefficiencies are particularly problematic when the software is being executed on a device with limited computational resources such as a tablet device, cell phone or other mobile electronic device.

SUMMARY OF EMBODIMENTS

There is a need for a more efficient image processing software, which provides an efficient man-machine user interface while making efficient use of computational resources. Embodiments of the present disclosure that are directed to achieving these aims and others are provided below:

In one aspect there is provided a computer implemented method for processing a digital image by an electronic device comprising a display and an input device. The method comprises maintaining ordered cached digital images arranged in a predetermined order, said ordered cached digital images comprising a base digital image and a subsequent plurality of modified cached digital images, each modified cached digital image associated with an image modification category, wherein each subsequent modified cached digital image is generated by performing image modification operations relating to its respective image modification category on the immediately preceding cached image in accordance with the predetermined order.

By storing a chain of cached images, each relating to a unique image modification category, the number of cached images that need to be retained is kept low in comparison to retaining a history of cached images. Further, only the cached image relating to the modified category and subsequent cached images in the chain have to be updated. Thus, the amount of processing performed is less than that required by having a conventional effects queue where the original image has to be reprocessed with every selected effect each time a user adds, removes or modifies an effect or adjustment.

In some embodiments the order of the cached images is predetermined according to the properties of the image modification category. For example, the order may be determined so that the image modification categories including more computationally intensive effects are placed towards the beginning of the chain. This means that the processing for those categories is on average likely to be performed fewer times improving refresh times when modifying effects. Alternatively, or as well as the order can be determined in accordance with which effects are most frequently used. In particular, image modification categories having effects which are rarely used would be place towards the beginning of the chain and those used more frequently towards the end of the chain.

In accordance with some embodiments, the cached image for a particular image modification category is only stored when image operations belonging to that image modification category are selected by a user. This is advantageous because it reduces memory usage where the user has applied only a small number (or none) of the image modification categories to the image. Upon receiving an instruction to apply an effect that belongs to an image category which has not previously been selected a cache image will be inserted at the predetermined position in the chain of cached images corresponding to that image category. Similarly where an instruction is received to remove a previously selected effect the cached image of the corresponding image category will be removed from the chain of cached images.

In some embodiments at least one image modification category comprises multiple image processing operations each independently adjustable by a user such that where the user has selected one or more of the operations to be applied the corresponding image modification category is selected. The advantage of grouping multiple functions into a single category is that the number of cached images that are required to be stored is reduced. There is a compromise between the memory saving by having a number of functions associated with a single cached image and the increased cost in processing of having all the selected operations associated with the group reprocessed when a user modifies any of those operations. This is because if any one of the functions belonging to the image modification category is modified then the image has to be reprocessed by applying all selected functions within that category in order.

In another aspect there is provided an electronic device comprising a display, an input device for receiving user input, one or more processors, and memory comprising instructions. The instructions when executed by the one or more processors cause the electronic device to maintain ordered cached digital images arranged in a predetermined order, said ordered cached digital images comprising a base digital image and a subsequent plurality of modified cached digital images, each modified cached digital image associated with an image modification category, wherein each subsequent modified cached digital image is generated by performing image modification operations relating to its respective image modification category on the immediately preceding cached image in accordance with the predetermined order.

A computer program product comprising instructions which when executed by a processor of an electronic device cause the device to process a digital image by maintaining ordered cached digital images arranged in a predetermined order, said ordered cached digital images comprising a base digital image and a subsequent plurality of modified cached digital images, each modified cached digital image associated with an image modification category, wherein each subsequent modified cached digital image is generated by performing image modification operations relating to its respective image modification category on the immediately preceding cached image in the list.

Other example embodiments of the present disclosure will be apparent to those of ordinary skill in the art from a review of the following detailed description in conjunction with the drawings, and may be related to a computer implemented method as well as the already described electronic device.

BRIEF DESCRIPTION OF DRAWINGS

Examples of the present proposed approach will now be described in detail with reference to the accompanying drawings, in which.

DETAILED DESCRIPTION

Example Electronic Devices

Figure 1:
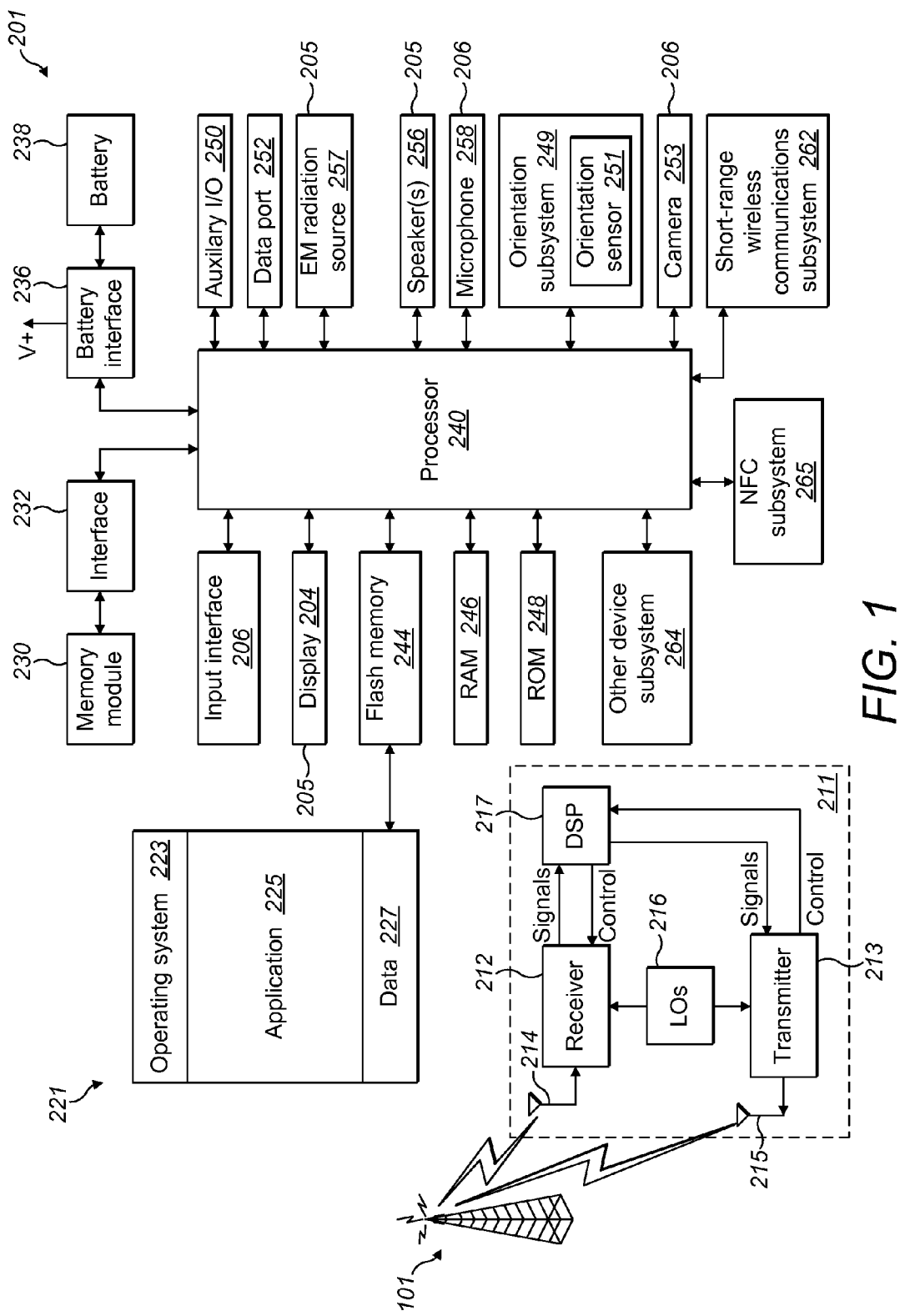
FIG. 1 is a block diagram illustrating an electronic device in accordance with example embodiments of the present disclosure.

Reference will now be made to FIG. 1 which illustrates an electronic device 201 in which example embodiments described in the present disclosure can be applied.

An electronic device 201 such as the electronic device 201 of FIG. 1 may be configured to enter into a connected environment with another electronic device 201, which may also be of the type illustrated in FIG. 1. It will be appreciated that one or more of the electronic devices 201 which are configured to enter the connected environment may be of a type which differs from the electronic device 201 of FIG. 1, and that some of the features, systems or subsystems of the electronic device 201 discussed below with reference to FIG. 1 may be omitted from electronic devices 201 which are configured to enter a connected environment with other electronic devices 201.

In the illustrated example embodiment, the electronic device 201 is a communication device and, more particularly, is a mobile communication device having data and voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone, such as a phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown) associated with a touch screen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

The electronic device 201 may include a touch screen display which acts as both an input interface 206 (i.e. touch-sensitive overlay) and an output interface 205 (i.e. display). The touch screen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. Examples of wireless networks include GSM/GPRS, UMTS, and LTE.

The electronic device 201 may include other wireless communication interfaces for communicating with one or a combination of the above or other types of wireless networks.

The auxiliary input/output (I/O) subsystems 250 may include an external communication link or interface; for example, an Ethernet connection. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

The electronic device 201 may also include a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The electronic device 201 may also include a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. The orientation sensor 251 could be an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

The orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may include a near field communications (NFC) subsystem 265. The NFC subsystem 265 is configured to communicate with other electronic devices 201 and/or tags, using an NFC communications protocol. NFC is a set of short-range wireless technologies which typically require a distance of 4 cm or less for communications. The NFC subsystem 265 may include an NFC chip and an NFC antenna.

The electronic device 201 may also include one or more cameras 253. The one or more cameras 253 may be capable of capturing images in the form of still photographs or motion video.

In at least some embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 and/or the housing of the electronic device 201. In such embodiments, the direction of capture of the camera is always predictable relative to the display 204 and/or the housing. In at least some embodiments, the camera may be provided in a central location relative to the display 204 to facilitate image acquisition of a face.

In at least some embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images obtained by the camera.

In some embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, the camera 253 is configured to capture at least some electromagnetic radiation which is not in the visible spectrum.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a common user interface (UI) mode between the electronic device 201 and another electronic device 201 which may be an electronic device 201 which is the same or similar to the electronic device 201 discussed with reference to FIG. 1. In some embodiments the short-range communication subsystem 262 is a wireless bus protocol compliant communication mechanism such as a Bluetooth® communication module or a WiFi module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The processor 240 operates under stored program control and executes software modules 221 stored in memory such as persistent memory; for example, in the flash memory 244. As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

The UI module may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 246 of the device 201 or other, non-volatile storage such as memory 230. On the other hand the computer readable medium may be a non-transitory computer readable medium comprising all computer-readable media, with the sole exception being a transitory, propagating signal.

Figure 2:
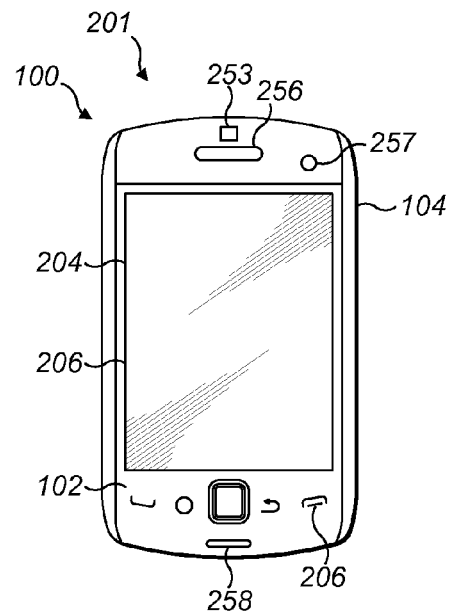
FIG. 2 is a block diagram illustrating a cellular mobile device in accordance with example embodiments of the present disclosure.

Referring now to FIG. 2, the electronic device 201 could be a cellular (or mobile) device 100. For example, the device 100 may have the ability to run third party applications which are stored on the device.

The device 100 may include the components discussed above with reference to FIG. 1 or a subset of those components. The device 100 includes a housing 104 which houses at least some of the components discussed above with reference to FIG. 1.

In the embodiment illustrated, the device includes a display 204, which may be a touch screen display which acts as an input interface 206. The display 204 is disposed within the device 100 so that it is viewable at a front side 102 of the device 100. That is, a viewable side of the display 204 is disposed on the front side 102 of the device. In the embodiment illustrated, the display 204 is framed by the housing 104.

The example device 100 also includes other input interfaces 206 such as one or more buttons, keys or navigational input mechanisms. In the embodiment illustrated, at least some of these additional input interfaces 206 are disposed for actuation at a front side 102 of the device.

Figure 3:
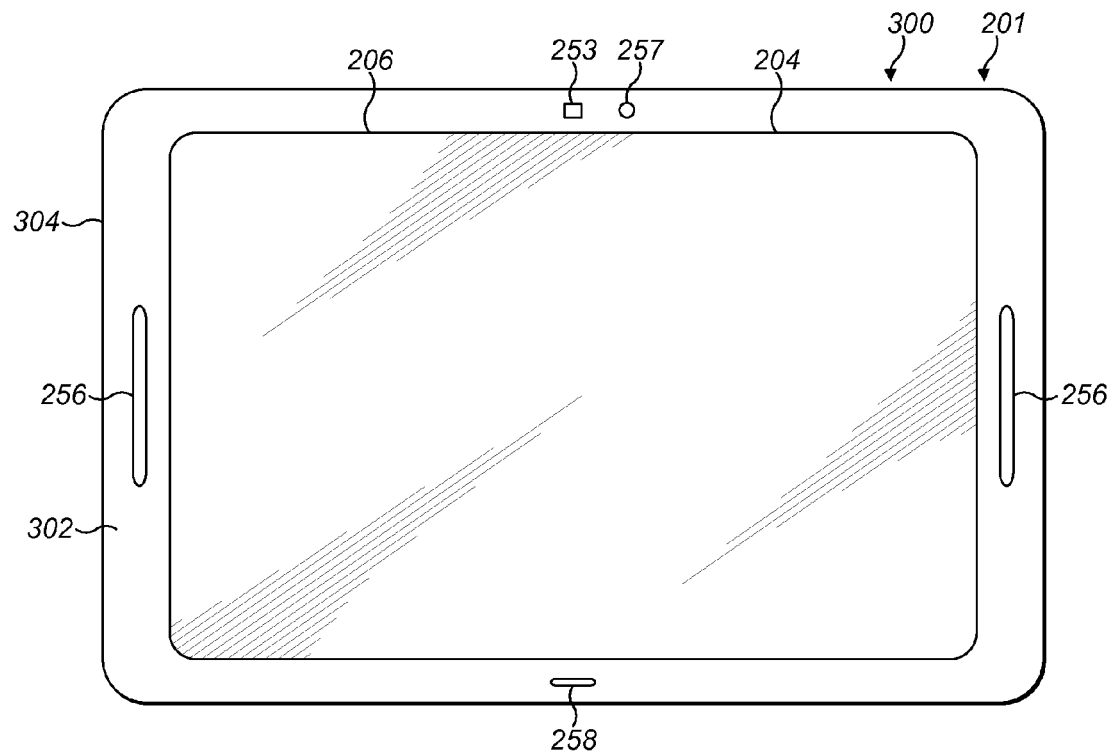
FIG. 3 is a block diagram illustrating a tablet electronic device in accordance with example embodiments of the present disclosure.

Referring now to FIG. 3, a front view of another example of an electronic device 201, a tablet computer 300, is illustrated. The tablet computer 300 may include many of the same features and components of the device 100 of FIG. 2. However, the tablet computer 300 of FIG. 3 is generally larger than the device 100. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touch screen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

User Interface

Figure 4:
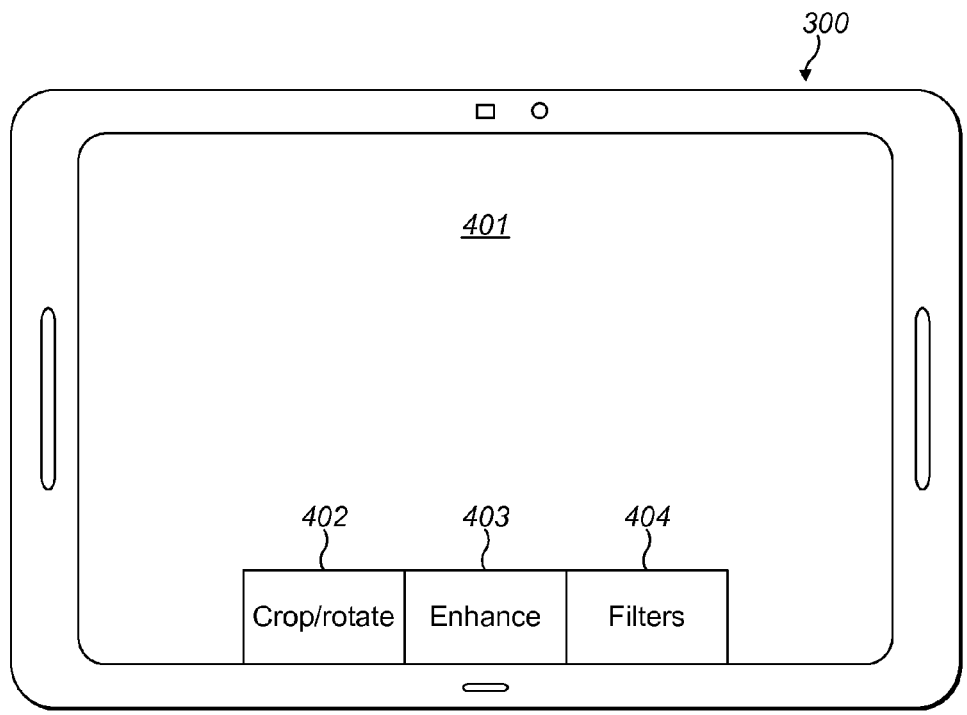
FIG. 4 is an illustration of a user interface implemented on a tablet electronic device.

FIG. 4 shows image editing software in an embodiment of the present application running on a tablet computing device as that described above and shown in FIG. 3. The user interface comprises an image panel 401, and three image modification tabs 402, 403, 404. Image panel 401 is used to show a screen sized preview of the image that is presently being edited including any modifications that have been performed by the user. The tabs relate to different types of image editing operations that can be performed by a user on the image. The tabs are selectable by a user, for example by performing a touch screen gesture such as tapping the tabbed area. Upon selection a new user interface view is presented to the user that allows the user to perform particular image editing operations associated with that tab. In this embodiment image modification tab 402 is labeled 'Crop and Rotate', tab 403 'Enhance' and tab 404 'Filters'.

Figure 5:
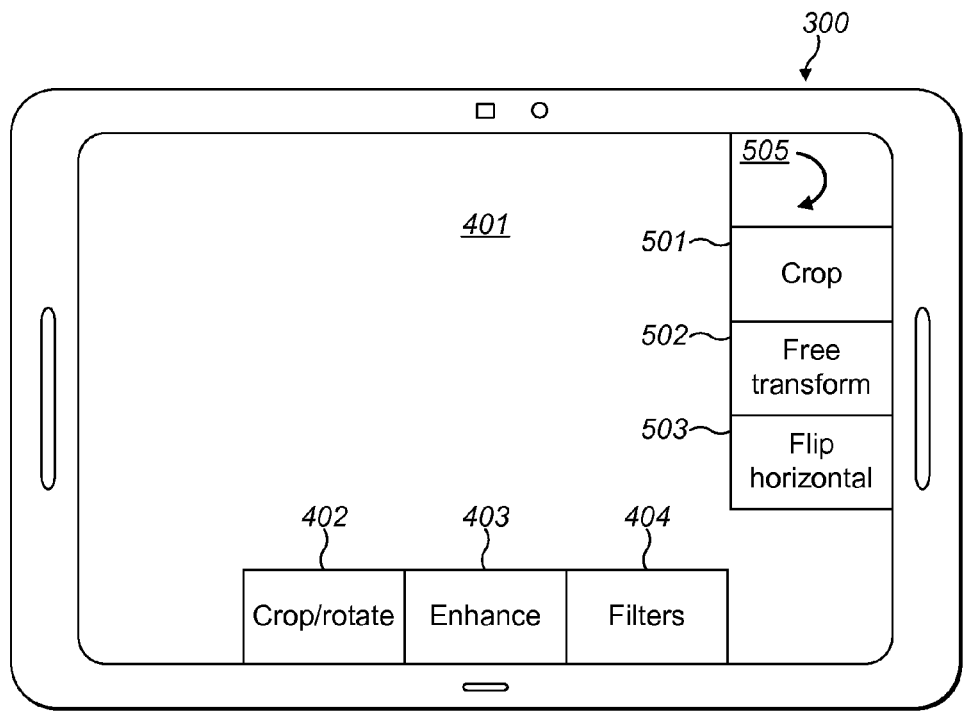
FIG. 5 is an illustration of the user interface implemented on a tablet electronic device in a 'Crop and Rotate' mode.

FIG. 5 shows the crop/rotate view. As before, the image that is being edited fills most of the screen. A list of possible commands 501, 502 and 503 are displayed down the right hand side of the screen. The list of commands includes transformation actions like "crop" 501, "free transform" 502, "flip horizontal" 503 and this list of commands can be scrolled through vertically if they do not fit on the screen. The effect of the crop or rotation operation is updated in real-time so that the user can see the effect of the crop/rotate operation they have performed. The main tabs 402, 403 and 404 remain at the bottom of the screen and the user remains free to switch between these.

Figure 6:
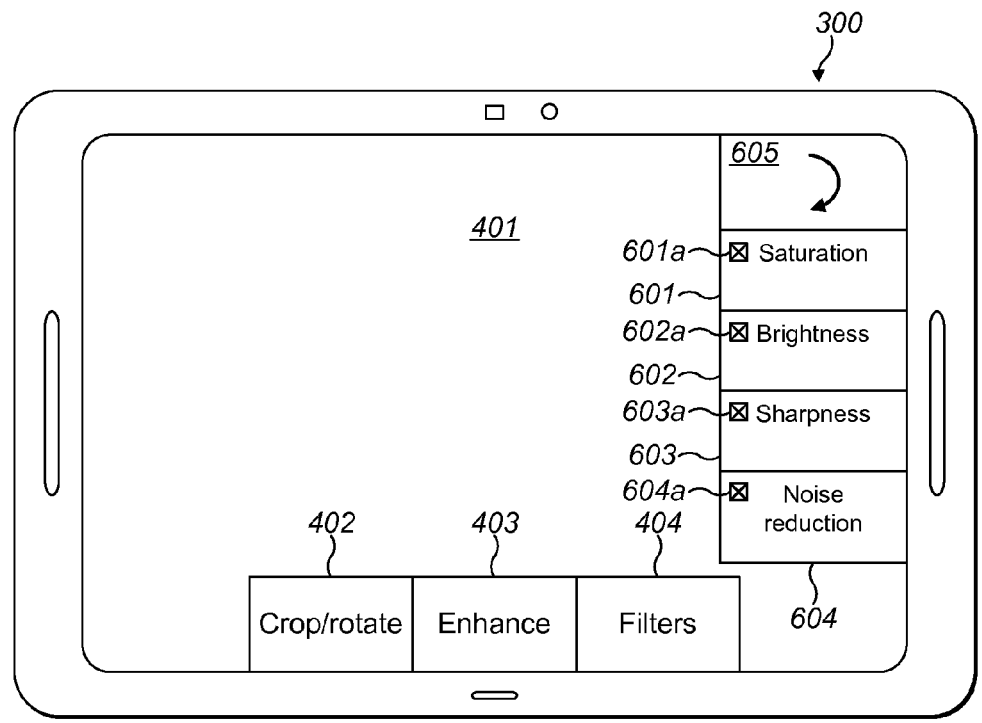
FIG. 6 is an illustration of a user interface implemented on a tablet electronic device in an 'Enhancements' mode.

FIG. 6 shows the view when the 'Enhance' tab 403 has been selected. Again, the main tabs 402, 403 and 404 remain at the bottom of the screen and the user is free to switch between these. Additionally, a list of functions 601-604 is displayed at the right-hand side of the screen. Each of these functions 601-604 represents adjustment operations that can be performed on the image. These can include, for example, saturation 601, brightness 602, sharpness 603, and noise reduction 604. A user can select any of adjustments 601-604 by checking an associated checkbox 601a-604a each displayed on the right-hand side of the screen next to the corresponding adjustment. Upon selection of the checkbox, user interface elements may be revealed that the user can interact with in order to adjust parameters associated with that particular adjustment. For example, selecting the saturation checkbox allows a user to make saturation adjustments. When the checkbox is selected an adjustable slider element is displayed. The user can adjust the position of the slider to increase or decrease the saturation.

Figure 7:
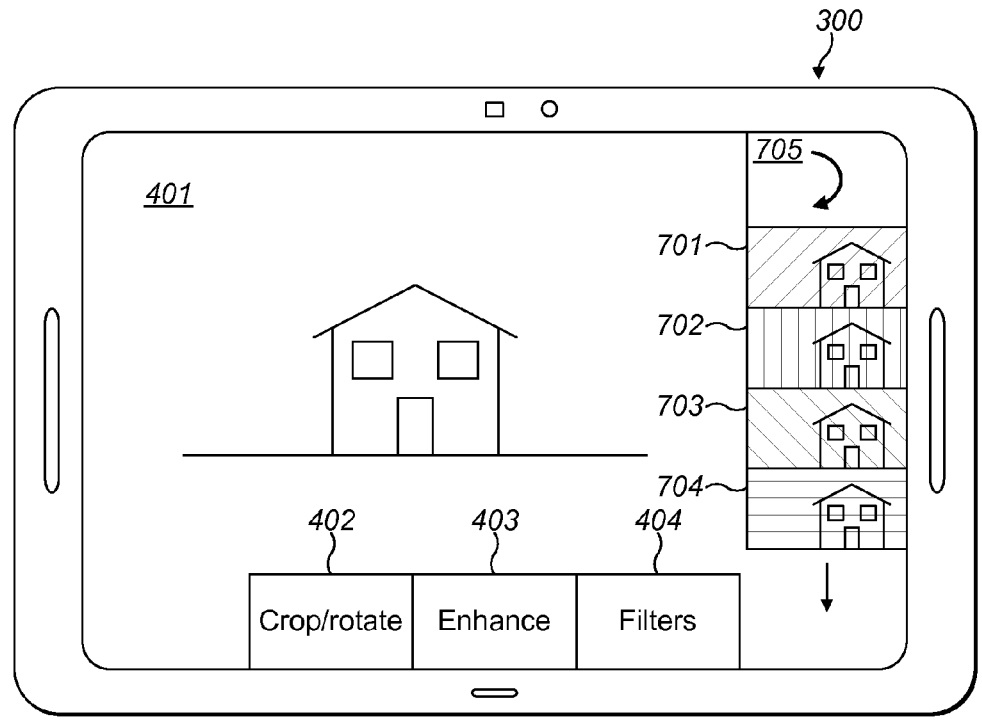
FIG. 7 is an illustration of a user interface implemented on a tablet electronic device in a 'Filters' mode.

FIG. 7 shows the view when the 'Filters' tab 404 has been selected by the user. In this view a set of thumbnail preview images 701-704 are displayed in a column at the right hand side of the screen. Each thumbnail corresponds to a preview of a particular filter effect. A filter can be applied to the image in the main image panel 401 by selecting the thumbnail of the filter that the user wishes applied to the main image. The main image is modified to show the filter applied and the user is presented with an option to confirm that they wish the selected filter effect to be applied. Once confirmed the thumbnail preview images in the right-hand column are updated in accordance with the changes to the main image.

The user can close the crop/enhance/filter views by selecting a return icon 505, 605, 705 or by performing a 'back' gesture at any time to return to the original view shown in FIG. 4.

Data Structures

As will be appreciated the grouping of the effects into the tabbed categories of the user interface is for the convenience of the user. The arrangement is designed to provide a convenient and intuitive interface to allow the user to quickly navigate to a particular type of modification that they wish to perform or experiment with. The underlying data structure that is maintained as the user views and edits an image will now be explained with reference to an example.

As stated above the image panel 401 shows a screen-sized preview of the image being edited. By 'screen sized' we mean that the resolution of the image preview corresponds to the resolution of a portion of the screen on which the image is to be displayed. In this embodiment, therefore, 'screen-sized' means having a resolution corresponding to the resolution of the image panel 401 when displayed on the tablet computer display. The base preview image is extracted typically from the original JPEG source file, which may have a resolution that is larger than the resolution of the image panel 401. The JPEG is decoded and resized to the image panel 401 resolution and stored as the base or first image in a data structure comprising an ordered list. When no edits or modifications have been performed the list will comprise only the base image. As will be explained in the section below, the application also generates an even smaller 'thumbnail' sized cache image which is utilized to generate the thumbnail previews displayed to the user when the filter tab has been selected.

As will explained further below, as the user applies or removes modifications to the image that correspond to particular image modification categories, corresponding cached images are added to or removed from the ordered list. In particular, one cached image is stored per image modification category and a cached image is only stored when the user has made image operations corresponding to that image modification category. The cached images are also screen-sized images and are used to efficiently allow reprocessing of the preview image shown to the user when performing edits. Memory is saved and processing speed increased by operating on reduced resolution screen sized images during the editing process. Upon finalizing and saving the edits the software takes the original full resolution JPEG image and applies all of the modifications made by the user. This way the user can quickly add or remove modifications and see the effect and have those modifications applied to the full resolution image for optimum output quality.

The modifications that the user can perform are broken down into image modification categories. A predetermined order by which these categories should be applied to the image is determined and this processing order determines the order in which the cached images are stored in the ordered list. In this embodiment the following order is used.

1. CROP
2. REDEYE_REDUCTION
3. NOISE_REDUCTION
4. BEAUTIFY
5-26. OTHER MODIFICATIONS

One cached image is stored for each of these categories. The order of the cached images is maintained in accordance with the predefined processing order. Each cached image is dependent only on its predecessor in the list. Thus, when a modification is made by the user in one of the image modification categories only the cached image corresponding to that image modification category and the subsequent cached images need to be re-processed. The cached images in the list preceding the cached image corresponding to the category of the image modification made are unchanged.

Accordingly, the order of the list is carefully selected so that categories having modifications that are applied less often and/or require a large amount of processing are placed nearer the beginning of the ordered list. Ideally, image modification categories are arranged such that modifications corresponding to succeeding categories do not have a meaningful consequence on operations corresponding to preceding categories. In particular, Redeye, Noise Reduction and Face Beautification require heavy processing to apply and are accordingly have associated cache images and are placed in the processing order before the effects 5-26) which require less processing.

Also, Redeye, Noise Reduction and Face Beautification are assumed to be more fundamental and accordingly the user is less likely to change them once set (at least not as much as the other effects 5-26).

The modifications (5-26) are designated as belonging to a single image modification category that includes the following effects.

5. AUTO_ENHANCE
6 WHITE_BALANCE
7. CONTRAST
8. SATURATION
9. BRIGHTNESS
10. SHARPNESS
11. DEFAULT
12. BLACK_N_WHITE
13. SEPIA
14. WHITEBOARD
15. WATERCOLOR
16. LOMO
17. ANTIQUE
18. SKETCH
19. NEGATIVE
20. BIG_EYES
21. CARTOON
22. HALF_TONE
23. OLD_PHOTO
24. GRAIN
25. FILM_STRIP
26. 60S

Doing the crop first allows re-sizing the (cropped) JPEG to a size that is as close as possible to the image UI component and that matches the aspect ratio of the crop rectangle.

FIG. 8a-8h show an example of the elements stored in the ordered list in accordance with a series of image modifications performed by a user. The ordered list 800 is shown as a series of rectangles each representing a cached image in the list. Arrows show the dependency of an image and shading is used to denote a new cached image or where a previously cached image has been reprocessed.

When a user loads an image for editing the image data is extracted from the original JPEG file 850 and re-sized to the dimensions of the image panel 401 user interface element 401. The re-sized image is cached as the base cache image 801 in the ordered list 800. The cached base image 801 is the only image in the ordered list 800 and is displayed in the image panel 401 as a preview of the current status of the image.

A user may apply crop or rotation operations by interacting with the options under the crop and rotation tab. The transformations are applied and the modified version is cached as the cached image corresponding to the crop and rotation image modification category. As upon loading the image no other modifications have been made only a single cached image 801 is maintained in the ordered list. This single cached image 801 is utilized as a preview of the edits performed by the user.

Figure 8A:
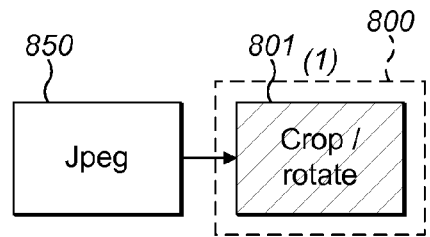
FIGS. 8a-8h are block diagrams showing the contents of cached data structure following a sequence of image modifications made a by a user.
Figure 8B:
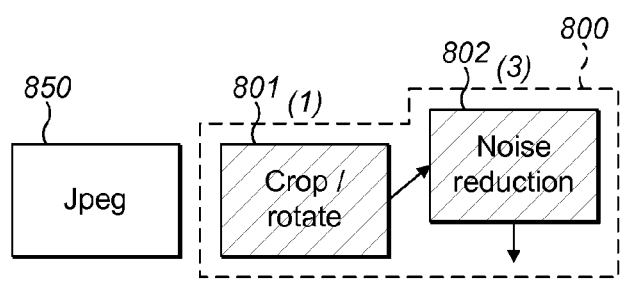

If the user now navigates to the enhance tab and checks the noise reduction effect then the ordered list is modified as shown in FIG. 8b. Specifically, a new cached image 802 corresponding to the noise reduction image modification category (3) is added to the ordered list. The cached noise reduction image is generated by applying the noise reduction effect to the preceding cached image in the list. In this case as the only operation that has been performed is the crop and rotation operation, the preceding cached image is the base cached image 801. Noise reduction is applied to the cached image 801 and the resulting image is stored after the crop and rotate cached image in accordance with the processing order set out above.

Figure 8C:
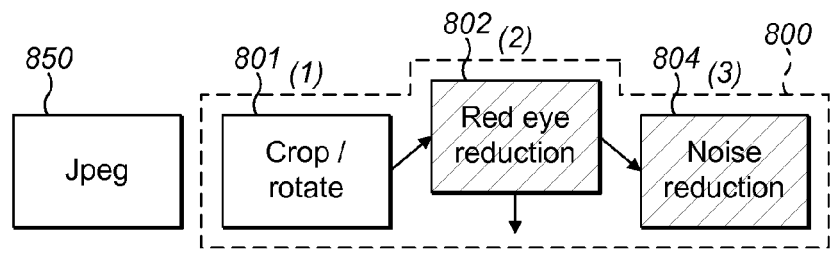

FIG. 8c shows what happens when the user subsequently applies the red-eye reduction effect. Red-eye reduction (2) is before noise reduction (3) in the image processing order. In accordance with the predetermined processing order, a new cached image 803 corresponding to the red-eye reduction category must be inserted into the ordered list between the crop and noise reduction cached images. The red-eye reduction cached image is generated by applying the red-eye reduction process to the preceding crop cached image 801. The resulting image is then inserted into the ordered list. Further, as noise reduction (3) is dependent on red-eye reduction (2), the subsequent cached image corresponding to the noise reduction category must be reprocessed. The noise reduction is applied to the cached red-eye reduction image and the resulting image 804 replaces the previous noise reduction cached image. The crop cached image 801 does not need to be reprocessed. Image 804 is displayed in the image panel 401 as representative of the current state of the image being edited.

Figure 8D:
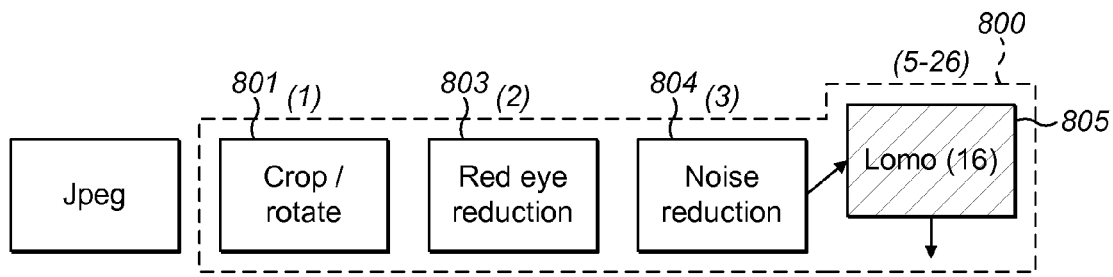

FIG. 8d shows what happens when one of the operations belonging to the group (5-26) is applied to the image. As set out above effects (5-26) belong to a single image modification category. Accordingly, if at least one of those effects is applied to the image then a corresponding cached image is created. Even if more than one effect from the group (5-26) is applied, only a single cached image is ever maintained for this category. The order in which the effects are applied to create the corresponding cached image is determined by the numerical processing order (5-26). In this example, the user applies the Lomo filter effect (16). The group (5-26) is the last category in the predetermined processing order and accordingly the corresponding cached image is to be inserted at the end of the ordered list. The immediately preceding image 804 corresponds to the noise reduction category. Thus, the noise reduction cached image 804 is processed by applying the Lomo filter effect (16) and the resulting image is cached as the last image in the ordered list. While a new cached image is added, note that none of the images in the ordered list that precede the new cached image are modified.

Figure 8E:
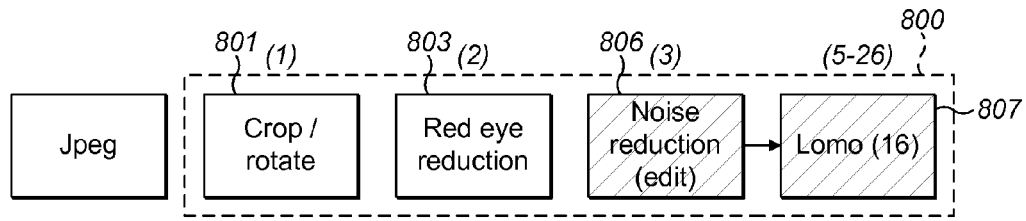
Figure 8F:
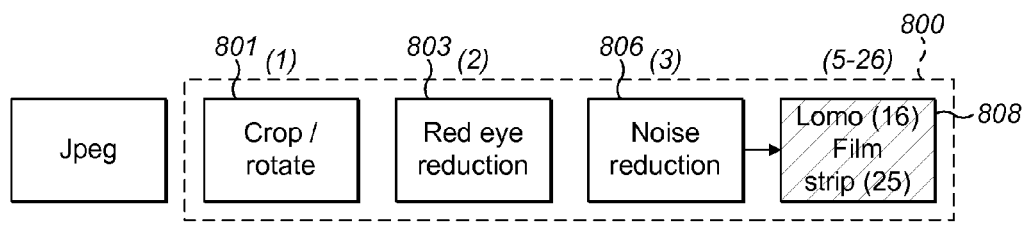

As well as applying new processes and adding filters the user can adjust the parameters of processes that have already been applied. For example, the parameters of some of the adjustments that can be selected under the 'Enhance' tab can be edited. For example, the strength of the noise reduction applied to an image can be edited. FIG. 8e shows what happens to the underlying ordered list of images comprising the cache when the parameters of the noise reduction effect (3) are edited by the user. A corresponding cached image 804 already exists corresponding to the noise reduction modification category. However, as shown in FIG. 8e this image 804 must be replaced with a new cached image 806 generated in accordance with the newly edited noise reduction parameters. The preceding image in the chain corresponding to the red-eye reduction category is processed using the newly modified noise reduction parameters and the resulting image 806 replaces the previous cached image 804. The cached image corresponding to the (5-26) group is then reprocessed using the new preceding cached image 806 resulting in new (5-26) cached image 807.

As noted above, it is possible that more than one effect from the (5-26) group may be selected and applied at the same time. For example, in addition to the Lomo filter (16) the user could also add the Film strip effect (26). In this case, the only cached image which needs to be replaced is the (5-26) cached image. However, the preceding image 806 must be reprocessed with both the Lomo and Film strip effects in accordance with the predetermined order. The resulting image 808 is cached as the (5-26) image modification category image. Note that as the (5-26) category image is at the end of the chain, no other cached images in the ordered list need to be modified.

Figure 8G:
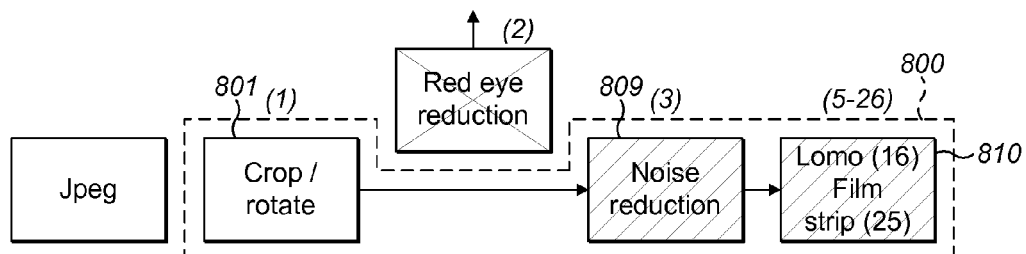

So far we have considered how the cache changes when processes are applied or edited by the user. However, the user is also free to remove processes or edits that have been previously applied to the image. For example, in the present scenario the user may wish to remove the red-eye reduction (2) altogether. FIG. 8g shows how the cache is modified as a result of such an event. In particular, the cached image 803 is deleted from the ordered list such that the crop image 801 becomes the image immediately preceding the noise reduction image 809. Accordingly, all cached images subsequent to the position of the removed cached image must now be reprocessed. Specifically, the noise reduction process is applied to the cropped image and the resulting image 809 replaces the previous image 806 for the noise reduction category. The Lomo (16) and Film Strip (26) effects are then applied to the new noise reduction cached image 806 and the resulting image 810 replaces the previous cached image for group (5-26) in the ordered list. The ordered list now comprises three cached images 801, 809 and 910 corresponding to the crop/rotate, noise reduction and (5-26) image modification categories.

Figure 8H:
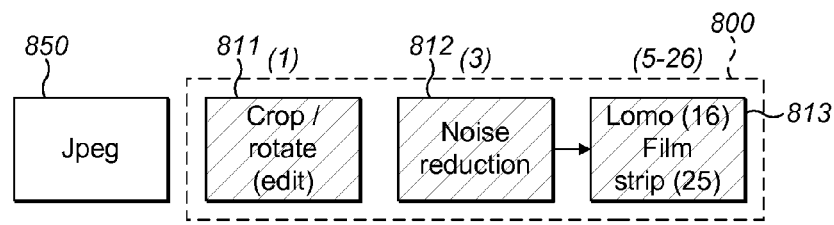

Finally, FIG. 8h shows what happens to the cache 800 when the user decides to modify the crop or rotation of the original image. If the crop or rotation is edited then the entire chain of cached images 801, 809 and 810 must be reprocessed in order such that the changes to the crop/rotation are propagated down the chain. A new crop image 811 is generated from the original JPEG 850, a new noise reduction image 812 is generated using the new crop image 812 and a new (5-26) image 813 is generated using the new noise reduction image 812. As the user is likely to modify the crop very rarely and typically before applying other effects the heavier processing burden imposed when editing the crop is acceptable.

Once the user has finished editing the image they can save the finished image. Upon saving, the full resolution image is extracted from the JPEG and processed in accordance with the processes applied by the user when editing the preview image. The processes are applied to the full resolution image in accordance with the predetermined processing order. The resulting image is saved in a desired format, for example, it may be saved as a JPEG or other compressed image format.

Figure 9:
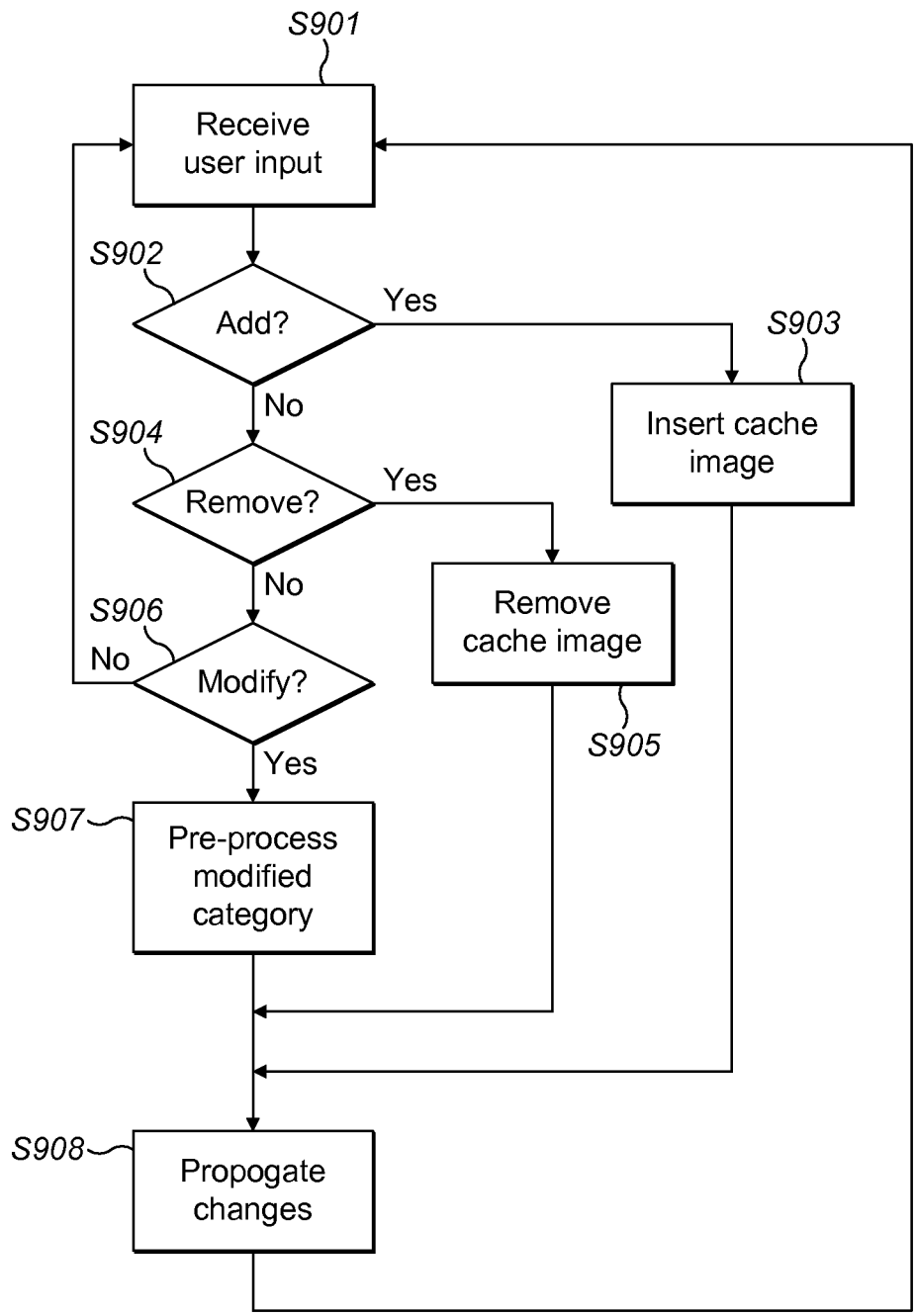
FIG. 9 is a flow chart illustrating the processing steps performed in an embodiment of the present disclosure.

A process for maintaining the ordered list in accordance with some embodiments will now be described with reference to the flow chart of FIG. 9. The process shown is performed by the electronic device with respect to a digital image being edited. Prior to the process being executed it is assumed that an image has been opened for editing, resized and stored as the base image in an ordered list of preview images stored in the cache memory. The process begins at step S901 where user input is received by the device relating to the image editing user interface. A determination is made at step S902 if the determined user input relates to adding a process to the image relating to an image modification category which has not been previously applied. If the determination is positive then processing branches to step S903 otherwise processing proceeds to step S904. At step S903 a new cached image corresponding to the newly added category is inserted in the ordered list at a position determined in accordance with the predetermined processing order. The new cached image is derived from the cached image in the list preceding the position where the image is to be inserted. Processing then proceeds to step S908.

However, if it is determined that the user input does not relate to adding a process relating to a new image modification category then processing continues at step S904. At step S904 it is determined if the user input relates to removing the only process relating to a particular image modification category. If the determination is positive then processing branches to step S905. At S905 the cached image corresponding to the image modification category of the removed process is removed from the ordered list.

In the event that the user input relates neither to adding or removing an image modification category then processing continues at step S906. At step S906 it is determined if the user input relates to modification of parameters of a process which has previously been applied. If it is determined that the user input relates to something other than modification of process parameters then the process returns to the beginning at step S901 and further user input is awaited. If the determination is positive, however, then the cached image corresponding to the image modification category to which the modified process relates is reprocessed in accordance with the newly modified parameters.

After any of steps S903, S905 or S907 processing continues at step S908. At step S908 any cached images in the ordered list subsequent to the removed, added or modified cached image are reprocessed. Each subsequent cached image is dependent on their predecessor in the ordered list and generated accordingly.

Thumbnail Previews

As described above, when a source image file is loaded, a screen-sized preview image is generated by creating a copy of the source file and resizing it for the screen. The screen-sized preview image is stored as the base image in the ordered list of cached images. In some embodiments, however, an additional cache is also generated and maintained, the additional cache comprising lower resolution thumbnail images. This thumbnail cache is maintained in a similar manner as for the screen-sized cache images. In some embodiments the thumbnail cache is used to provide the previews of the filters shown upon selection of the 'Filters' tab.

For example, from the final cached image in the ordered list of thumbnails, a number of copies are generated (preferably in the background) one for each available filter effect. Each additional thumbnail has a different one of the available filter effects applied to it. When the filter tab is selected, the screen-sized cached image is displayed on the main image panel 401 of the user interface. The smaller pre-processed thumbnails showing previews of the filter effects are displayed if the user switches to the 'filters' tab in a right hand column for review and selection by the user.

When a user performs a crop/rotate operation, the app takes the source image, performs the transformation on it and then regenerates the screen-sized cached images along with the thumbnail-sized cached images.

When a user performs an 'enhance' command, the app takes the current screen-sized cached image, performs the selected effect by updating the screen sized and thumbnail caches and then regenerates the thumbnail-sized cached filter preview images.

If a user selects a filter from the previews in right hand column, the current screen-sized cached image is modified and the ordered list of screen sized cached images is updated. The thumbnail sized cached images are then also updated once the filter is applied.

In a further embodiment two pairs of image caches (i.e. four caches in total) are maintained. One pair stores screen sized images having a size and resolution to fit the image panel 401 of the user interface. The other pair stores thumbnail sized images for utilization in the 'Filters' view. Each pair comprises a first chain of cached images without the crop settings selected by the user applied and another chain of cached images with the crop settings applied. The advantage of maintaining multiple caches is that it allows for rapid switching where the user adds or removes crop settings. Rather than propagate the removal of a crop throughout a single chain of cached images, the application can merely switch the currently displayed image to its equivalent image in the un-cropped cache.

Background Processing

In some embodiments, cached images for certain image modification processes are automatically generated in anticipation of their activation by the user. This can be advantageous because it saves processing time in the event that it anticipates the process being selected by a user. For example, the beautify operation is known to be processor and memory intensive. Thus, selection of this effect can introduce a lag in operation while the changes introduced by the beautify process are applied. By having a cached image for the beautify process pre-processed in the background this delay can be reduced.

In some embodiments multiple buffer images and caches are updated continuously in the background. Preferably these are prioritised by an update function called by the application thread. Typically the update function will be called by the application thread and ran repeatedly until all possible pre-processing and updating of caches has been completed. The thread then sleeps until a change in state of the editing application by the user at which point the thread becomes active and the update function is called again repeatedly until all possible processing is complete.

In one embodiment, the following processing order is used:
1) Update main cache comprising ordered list of screen sized images
2) Generate preview image to be displayed in image panel 401 (from cache)

3) Process any other caches (e.g. thumbnail, un-cropped, cropped thumbnail etc)
4) Process a screen-sized cache with beautify effect applied (only performed if beautify not presently selected)
5) Pre-process other preview images (e.g. slider foreground and background)
6) Pre-process thumbnails for 'Filter' view (e.g. Un-cropped, Black and White, Sepia, Watercolour, Whiteboard, Lomo, Antique, Sketch, Negative, Half tone, Beautify, Grain, Film Strip, 60s, Big Eyes, Cartoon, Old Photo)
7) Pre-process frame image(s) (e.g. 'Whiteboard' or 'Film strip' by overlaying a PNG image with transparent pixels in the centre to the current image)

Each item is checked for validity and updated only if it's not valid. If it is valid then that item is ignored and the function moves to the next item. If all items are valid this indicates that there is no further pre-processing that can be usefully performed. In step 5) pre-processing is performed for a number of screen sized preview images. In one embodiment these are used to pre-process images for the 'Filters' tab that allow a user to preview the effect of a filter by applying a sliding gesture. As the user slides across the image the filter is gradually applied up to the position of the user's finger. This effect is generated by having a background image with the previewed effect being applied and a foreground image (typically the current image) without the previewed effect applied. As the user swipes from right to left the foreground image is rendered transparent and the underlying background image revealed. In order for this visualisation to be displayed rapidly and without lag, it is desirable to have the background and foreground images buffered in the background prior to the user performing the swipe.

The above processing order is not to be construed as limiting. The order and number of elements that are background processed may be determined in accordance with the processing and memory limitations of the device on which the application is to be executed. For example, where memory is limited, the number of buffered single images, and caches maintained may be less to avoid unduly burdening the device.

In some embodiments, the background processing happens whenever it is detected that the device has a predetermined quantity of spare processing or memory. As described above then one cached image can be pre-processed which has the advantage of increasing the speed of operation when applying edits to an image but the disadvantage of requiring a lot of background processing capacity. If too many cached images are pre-processed then the benefits may be mitigated by the reduced speed of operation of the other functionalities of the device caused by the additional processing burden.

Other Embodiments

In the embodiments described above a cached image for an image modification category is only stored in the ordered list if the user has performed image modifications relating to that category. However, in other embodiments cached images are retained for each image modification category even when the user has made no related modifications. This has the disadvantage in that it requires more memory but has the advantage that processing is simplified because there is no need to insert or remove cached images to the ordered list.

Also, as described above the screen-sized cached images are derived from an original JPEG and resized in accordance with the image panel 401. The size and resolution of the image panel 401 may vary according to the device and platform on which the application software is run. Accordingly, in some embodiments the resolution and size of the re-sized images is determined depending on a detection of the device and platform on which the software application is executed.

Although the above embodiments describe an implementation on a mobile touch screen electronic device, the described processes can be implemented on any electronic device having a display and an input device. For example, the present disclosure is applicable to desktop computers, or in a distributed system with a client-server architecture as well as non touch screen mobile electronic devices. In some embodiments the process may be performed in a cloud computing environment with the process carried out remotely on a server and the user input performed on a client device which communicates with the server over the internet or other network. For example, the cache comprising the ordered list of images could be maintained remotely by a cloud server during a session with the client device and deleted upon termination of the session.

In the above embodiments the base cached image is described as having been extracted from an original JPEG image. However, in some embodiments only parts of the JPEG that are needed to construct the preview image are decompressed. For example, where only a portion of the image is selected for editing then only that portion of the JPEG will be decompressed. Further, the above described processes are not limited to operating on JPEGs. The process is applicable to any image format both compressed and uncompressed. For example, the original image could by a TIFF image or derived from a camera RAW image file.

In the above embodiments, a particular processing order and a particular set of image modifications are described. However, it is to be appreciated that the described list is not intended to be limiting. In particular, the described process can be modified by applying the modifications in a different order or having fewer or greater effects. The processing order can be determined in accordance with the considerations relating to processing and frequency of use or by other considerations in order to optimize the application.

The invention claimed is:

1. A computer implemented method for processing a digital image by an electronic device comprising a display and an input device, said method comprising:
maintaining ordered cached digital images arranged in a predetermined order, said ordered cached digital images comprising a base digital image and a subsequent plurality of modified cached digital images, each modified cached digital image associated with a different image modification category,
wherein each subsequent modified cached digital image is generated by performing image modification operations relating to its respective image modification category on the immediately preceding cached image in the list; and
receiving a user request to add a category of image modification and adding a cached image corresponding to the added image modification category to the maintained cached images in accordance with the predetermined order.

2. A method according to claim 1 wherein said predetermined order relates to the computational effort required to perform operations belonging to the respective image modification categories.

3. A method according to claim 1 wherein said predetermined order relates to the frequency of use by a user of operations belonging to the respective image modification categories.

4. A method according to claim 1 wherein the order of the cached images is predetermined such that operations relating to an image modification category to which a cached image relates are dependent only on operations relating to image modification categories associated with preceding cached images in the list.

5. A method according to claim 1 wherein the image modification categories exclude, or are in addition to, image modification categories relating to crop or rotation operations.

6. A method according to claim 5 wherein the base digital image comprises a cropped or rotated digital image.

7. A method according to claim 1 wherein said base digital image is derived from an original full sized JPEG image and said cached digital images comprise reduced resolution images.

8. A method according to claim 7 wherein said reduced resolution images comprise screen sized images having a resolution related to the display resolution of the device or thumbnail images having a low resolution relative to the resolution of the display.

9. A method according to claim 1 further comprising receiving a request to modify the image, said request relating to one of the image modification categories; and
updating the cached image associated with the image modification category of the request and any subsequent maintained cached images in accordance with the request.

10. A method according to claim 9 wherein updating the cached image relating to the image modification category of the request comprises:
generating a new image by applying one or more image modification operations in accordance with the request to the cached image immediately preceding the cached image associated with the image modification category of the request; and
replacing the cached image associated with the image modification category of the request with the newly generated image; and
updating any subsequent cached images by propagating the changes to the subsequent maintained cached images.

11. A method according to claim 9 wherein the request to modify the image identifies parameters of one or more operations belonging to one of the image modification categories.

12. A method according to claim 9 wherein updating any images subsequent to the cached image associated with the modification category of the request comprises:
for each subsequent cached image performing one or more image modification operations relating to the image modification category associated with that subsequent cached image to the immediately preceding cached image;
wherein the subsequent cached images are processed sequentially in accordance with the predetermined order by which they are maintained.

13. A method according to claim 1 wherein said image modification categories are selectable by selecting processes to be applied to the image via the input device; and
a cached image for an image modification category is only maintained when at least one image modification operation associated with that image category have been selected.

14. A method according to claim 13 wherein if said image modification request comprises a request to remove a category of image modification the method further comprises:
removing the cached image relating to the modification category of the request from the maintained cached images.

15. A method according to claim 1 wherein at least one image modification category relates to a plurality of image processing operations.

16. A method according to claim 1 wherein maintaining cached images comprises maintaining a plurality of sets of cached images.

17. A method according to claim 16 wherein one of the maintained sets of cached images comprises preview images of a resolution related to the display resolution of the device and another comprises images of a lower resolution.

18. A method according to claim 16 further comprising pre-processing some or all of the cached images utilising background processing wherein said images are processed according to a predetermined order of priority.

19. A method according to claim 18 further comprising pre-processing additional individual images for buffering previews or visualisations relating to specified effects.

20. An electronic device comprising:
a display;
an input device for receiving user input;
one or more processors; and
memory comprising instructions which when executed by the one or more processors cause the electronic device to:
maintain ordered cached digital images arranged in a predetermined order, said ordered cached digital images comprising a base digital image and a subsequent plurality of modified cached digital images, each modified cached digital image associated with a different image modification category,
wherein each subsequent modified cached digital image is generated by performing image modification operations relating to its respective image modification category on the immediately preceding cached image in accordance with the predetermined order; and
receive a user request to add a category of image modification and add a cached image corresponding to the added image modification category to the maintained cached images in accordance with the predetermined order.

21. An electronic device according to claim 20 wherein said predetermined order relates to the computational effort required to perform operations belonging to the respective image modification categories.

22. An electronic device according to claim 20 wherein said predetermined order relates to the frequency of use by a user of operations belonging to the respective image modification categories.

23. An electronic device according to claim 20 wherein the order of the cached images is predetermined such that operations relating to an image modification category to which a cached image relates are dependent only on operations relating to image modification categories associated with preceding cached images in the list.

24. An electronic device according to claim 20 wherein the image modification categories exclude, or are in addition to, image modification categories relating to crop or rotation operations.

25. An electronic device according to claim 24 wherein the base digital image comprises a cropped or rotated digital image.

26. An electronic device according to claim 20 wherein said base digital image is derived from an original full sized JPEG image and said cached digital images comprise reduced resolution images.

27. An electronic device according to claim 26 wherein said reduced resolution images comprise screen sized images having a resolution related to the display resolution of the device or thumbnail images having a low resolution relative to the resolution of the display.

28. An electronic device according to claim 20 wherein the instructions further cause the electronic device to receive a request to modify the image, said request relating to one of the image modification categories; and
update the cached image associated with the image modification category of the request and any subsequent maintained cached images in accordance with the request.

29. An electronic device according to claim 28 wherein updating the cached image relating to the image modification category of the request comprises:
generating a new image by applying one or more image modification operations in accordance with the request to the cached image immediately preceding the cached image associated with the image modification category of the request; and
replacing the cached image associated with the image modification category of the request with the newly generated image; and
updating any subsequent cached images by propagating the changes to the subsequent maintained cached images.

30. An electronic device according to claim 28 wherein the request to modify the image identifies parameters of one or more operations belonging to one of the image modification categories.

31. An electronic device according to claim 28 wherein updating any images subsequent to the cached image associated with the modification category of the request comprises:
for each subsequent cached image performing one or more image modification operations relating to the image modification category associated with that subsequent cached image to the immediately preceding cached image;
wherein the subsequent cached images are processed sequentially in accordance with the predetermined order by which they are maintained.

32. An electronic device according to claim 20 wherein the instructions further cause the electronic device to permit said image modification categories to be selectable by selecting operations to be applied to the image via the input device; and
only maintain a cached image for an image modification category when at least one image modification operation associated with that image category has been selected.

33. An electronic device according to claim 32 wherein said instructions further cause the electronic device to:
if said image modification request comprises a request to remove a category of image modification,
remove the cached image relating to the modification category of the request from the maintained cached images.

34. An electronic device according to 20 wherein at least one image modification category relates to a plurality of image processing operations.

35. An electronic device according to claim 20 wherein maintaining ordered cached digital images comprises maintaining a plurality of sets of ordered cached digital images.

36. An electronic device according to claim 35 wherein one of the maintained sets of ordered cached images comprises preview images of a resolution related to the display resolution of the device and another comprises images of a lower resolution.

37. An electronic device according to claim 35 further comprising pre-processing some or all of the cached images to be maintained utilising background processing wherein said pre-processed images are processed according to a predetermined order of priority.

38. An electronic device according to claim 37 further comprising pre-processing additional individual images for previews or visualisations relating to specified effects for display on the device.

39. A non-transitory computer readable medium storing instructions which when executed by a processor of an electronic device cause the device to process a digital image by
maintaining ordered cached digital images arranged in a predetermined order, said ordered cached digital images comprising a base digital image and a subsequent plurality of modified cached digital images, each modified cached digital image associated with a different image modification category,
wherein each subsequent modified cached digital image is generated by performing image modification operations relating to its respective image modification category on the immediately preceding cached image in the list; and
receiving a user request to add a category of image modification and adding a cached image corresponding to the added image modification category to the maintained cached images in accordance with the predetermined order.

* * * * *